United States Patent [19]

Batarseh

[11] Patent Number: 5,616,251

[45] Date of Patent: Apr. 1, 1997

[54] METHODS TO PREVENT AND TREAT ACID MINE DRAINAGE AND TO REMOVE METALS AND NON-METALS FROM AQUEOUS SOURCES

[75] Inventor: Kareem I. Batarseh, Morgantown, W. Va.

[73] Assignees: Kareem Batarseh, Morgantown, W. Va.; Farid N. Ghadry, McLean, Va.

[21] Appl. No.: 561,182

[22] Filed: Nov. 20, 1995

[51] Int. Cl.$^6$ .................................................. C02F 1/62
[52] U.S. Cl. .................. 210/725; 210/728; 210/729; 210/747; 210/912; 210/919; 405/264; 588/252; 588/256
[58] Field of Search .................................. 210/702, 717, 210/723, 725, 728, 729, 912, 919, 747; 405/264; 588/252, 256

[56] References Cited

U.S. PATENT DOCUMENTS

| | | | |
|---|---|---|---|
| 3,238,127 | 3/1966 | Sebba | 210/704 |
| 3,694,356 | 9/1972 | Vander Horst | 210/919 |
| 3,755,158 | 8/1973 | Inazuka | 210/50 |
| 5,009,793 | 4/1991 | Muller | 210/717 |
| 5,374,358 | 12/1994 | Kaniecki | 210/708 |

OTHER PUBLICATIONS

"Mathematical Model for Heterogeneous Reactions with a Moving Boundary," Batarseh et al., AIChE Journal, vol. 35, No. 4, Apr. 1989.

"Modeling the Role of Bacteria in Leaching of Low–Grade Ores," Batarseh et al., AIChE Journal, vol. 40, No. 10, Oct. 1994.

"Silicate and Alumina/Silica Gel Treatment of Coal Refuse for the Prevention of Acid Mine Drainage," *Silicate Treatment for Acid Mine Drainage Prevention*, Tyco Laboratories, Inc. for the Environmental Protection Agency, Project No. 14010DLI, Contract No. 14–12–560, Feb. 1971.

*Primary Examiner*—Peter A. Hruskoci
*Assistant Examiner*—Betsey J. Morrison
*Attorney, Agent, or Firm*—Finnegan, Henderson, Farabow, Garrett & Dunner

[57] ABSTRACT

The present invention is directed to the use of water-soluble compositions containing a compound having a Lewis base group attached to a hydrophobic group where the Lewis base group is capable of donating at least one lone pair of electrons to a metal. These compositions are effective in treating acid mine drainage by treating the source of the acid mine drainage as well as the acid mine drainage waters. These compositions are also effective in removing metal and non-metal ions from aqueous sources and the process can be modified to allow the selective removal of metal and non-metal ions from aqueous sources.

42 Claims, No Drawings

METHODS TO PREVENT AND TREAT ACID MINE DRAINAGE AND TO REMOVE METALS AND NON-METALS FROM AQUEOUS SOURCES

BACKGROUND OF THE INVENTION

The present invention relates to methods of preventing acid mine drainage, treating acid mine drainage waters, removing metal and non-metal ions present in aqueous sources, and selectively recovering them from aqueous sources.

Acid mine drainage (AMD) is the phenomenon of acid production from mining tailings and frequently contains toxic metals. It results from the mining of precious metals (e.g., platinum, gold, and silver), radioactive metals (e.g., uranium and radium), and coal, and both working and defunct mines have AMD problems associated with them. AMD is a major environmental problem and has been a long-standing major concern to scientists, engineers, industry, and governments, both in this country and throughout the world.

AMD is produced by the oxidation of sulfide minerals (notably, pyrite) and ferric iron in the presence of a bacteriological catalyst, e.g., *Thiobacillus ferrooxidans*, producing ferrous sulphate and sulfuric acid by a complex series of chemical reactions.

The high acidity and the presence of toxic metals in AMD waters degrade soil, air, and water quality, and detrimentally impact vegetation and aquatic life. Consequently, mine waste waters, prior to being released into the environment, must be treated to meet government standards for the amount of metal and non-metal ions contained in the water. Some of these metals, such as uranium and selenium, which cause deleterious health effects, are extremely difficult to remove from mine waste waters.

Worldwide focus on AMD is increasing as countries become aware of the cost to industry and to the environment, especially since AMD is recognized as potentially impacting the environment more than subsoil acidity. One report has estimated that within the next ten years the Worldwide liability resulting from AMD will be between $10 to $20 billion. Meetings and conferences have been held Worldwide to discuss AMD, with no concrete solution to the problem.

In the past, efforts to treat mine waste waters have been ineffective or prohibitively expensive. Because treatment is ineffective at removing some metal and non-metal ions, mining throughput is sometimes restricted by government regulation. Because treatment is so expensive, no cleanup has occurred in many cases, especially for abandoned mines. Moreover, although some of the metal and non-metal ions abundant in mine waste waters are quite valuable, they cannot be economically extracted.

One attempted solution to AMD was simply to neutralize the mine waste waters with lime or limestone and then aerate. This method precipitates the iron, which is the metal most abundant in AMD waters, but other metals present are difficult to precipitate out and are not removed by this treatment. Also, remobilization of the contaminants can occur as well.

Other methods have treated mine waste waters with ionic surfactants to control the bacterial population and, thereby, inhibit the oxidation of ferrous iron to ferric iron. This strategy, however, has not been successful because many other factors, such as changing intraparticle diffusional resistances, are involved in controlling AMD, which this attempted solution does not take into account.

It has been hypothesized that phosphate could control AMD formation. However, this proposed solution is economically infeasible, since it has been discovered that high dosages are required. Further, the proposed phosphate system is pH sensitive, and when the pH decreases, the acid production cycle causing AMD is reinitiated.

A study has shown that sodium silicate at relatively high pHs can form ferrous and ferric precipitates. This approach, however, is uneconomical and results in remobilization of the contaminants in a way similar to that of using phosphate and limestone as described above.

Accordingly, there is an immediate need for a solution to the problem of AMD which overcomes the difficulties and failures described above.

SUMMARY OF THE INVENTION

A feature of the present invention is to provide a method to prevent acid mine drainage from initially occurring and/or to treat existing acid mine drainage.

Another feature of the present invention is to provide a method to remove metal and non-metal ions present in aqueous sources, including mine waste waters.

An additional feature of the present invention is to provide a method to selectively recover metal and/or non-metal ions from aqueous sources, such as industrial waste water.

Additional features and advantages of the present invention will be set forth in part in the description which follows, and in part will be apparent from the description, or may be learned by practice of the present invention. The objectives and other advantages of the present invention will be realized and attained by means of the elements and combinations particularly pointed out in the written description including the appended claims.

To achieve these and other advantages and in accordance with the purpose of the present invention, as embodied and broadly described herein, the present invention relates to a method which prevents or treats acid mine drainage and includes the step of adding to the source of the acid mine drainage and/or to the acid mine drainage waters at least one water-soluble composition containing a compound having a Lewis base group attached to a hydrophobic group. The Lewis base group is capable of donating at least one lone pair of electrons to a metal.

The present invention also relates to a method to remove at least one metal or non-metal ion from an aqueous source containing one or more metal and/or non-metal ions and includes the step of adding at least one water-soluble composition of the present invention to the aqueous source.

Additionally, the present invention relates to a method to selectively remove or recover metal and/or non-metal ions from an aqueous source containing these metal and non-metal ions and includes the step of adding at least one water-soluble composition of the present invention to the aqueous source and adjusting the pH of the aqueous source to selectively precipitate out at least one element selected from the group consisting of Al, As, Cr, Cu, Fe, Pb, Mn, Ni, Se, Zn, and Si.

It is to be understood that both the foregoing general description and the following detailed description are exemplary and explanatory only and are intended to provide further explanation of the present invention, as claimed.

DETAILED DESCRIPTION OF THE PRESENT INVENTION

The compositions of the present invention which are effective in either preventing AMD from occurring or treating existing AMD are water-soluble compositions containing at least one compound having a Lewis base group attached to a hydrophobic group. The Lewis base group is capable of donating at least one lone pair of electrons to a metal. Preferably, the compound is water-soluble. More preferably, the compounds of the present invention have the general formula:

R—M

In this formula, R is a hydrophobic organic moiety which preferably is an unsubstituted or substituted alkyl, ether, phenyl, phenoxy, carboxylic, amine, ester, or amide group.

Further, M is a chemical group or moiety that is hydrophilic and serves as a Lewis base which can donate at least one electron pair through, for instance, coordination covalent bonding to an ion, for instance iron, manganese, silicon and the like. Preferably M is selected from $PO_4^{3-}$, $CO_2^-$, $NH^{2-}$, $NH_2^-$, and $N^{3-}$.

By the term "substituted," the various R groups can have one or more substituents attached to the organic group such as: tallows, ethoxylates, and carboxylic acids.

One preferred substituent is an aromatic side group such as an aryl group. Preferred aryl groups are: phenol, alkyl substituted phenols, and alkyl substituted phenoxy groups.

One particularly preferred water-soluble compound of the present invention is a water-soluble alkylated phosphate. Preferred examples of water-soluble alkylated phosphates are phosphoglyceride and tributylester phosphorous acid. Typically, the water-soluble alkylated phosphate compounds of the present invention are liquids at ambient temperatures.

The compound of the present invention can also be formed in situ. For example, two or more compounds can be added in an aqueous solution to form the compound of the present invention. In further detail, the M or Lewis base group from the above formula can be derived from the addition of cyanide and the like.

In a like manner, the R or hydrophobic group can be derived from the addition of a petroleum hydrocarbon or distillate, such as diesel fuel or gasoline. Also the hydrophobic group can be derived from oil, grease, or mixtures thereof. Additional sources from which the hydrophobic group can be derived from include, but are not limited to, aromatic compounds, such as xylene, toluene, ethyl benzene, benzene, and mixtures thereof.

Those compounds available as solids can be reduced to powder form by any means known to those skilled in the art. The compounds of the present invention that form the composition of the present invention, whether liquid or solid, are preferably suspended, dispersed, or dissolved into an aqueous solution (e.g., water). This solution can then be brought into contact with the AMD waters or the source of the AMD. Alternatively, the composition of the present invention need not be mixed into an aqueous solution. Instead, a concentrated form of the composition of the present invention can be added directly to the AMD waters and/or the source of the AMD, e.g., mine waste rocks and the like. Preferably, the composition of the present invention, or the compounds forming the composition of the present invention are first dispersed, suspended, or dissolved into an aqueous solution which then is added to an area to be treated (e.g., AMD waters). If the composition of the present invention or the compounds forming the composition of the present invention are first dispersed, suspended, or dissolved in an aqueous solution, the pH of the resulting aqueous solution is preferably about 12.

The compositions of the present invention can be added to the area to be treated by any known means of applying a solution including, but not limited to, spraying and pouring. Preferably, during and after the application of the present invention's composition, the AMD waters or other aqueous source is agitated (e.g., mixed) to increase the dispersion of the composition which lessens overall treatment time.

Preferably, a sufficient amount of the composition of the present invention is suspended, dispersed, and/or dissolved in an aqueous solution so that from about 65 ppm to about 150 ppm, more preferably about 75 ppm of the composition of the present invention is present in the aqueous solution.

Generally, the preferred amount of the composition of the present invention to be added to AMD waters or other aqueous sources is an amount sufficient to neutralize (preferably at least greater than pH 7, more preferably from about pH 8 to about pH 14) the AMD waters or other aqueous sources and cause substantial or complete precipitation of metal and non-metal ions present in the AMD waters or other aqueous sources. Regarding the treatment of the source of AMD, an amount should be used that is sufficient to prevent AMD from occurring through precipitation reactions. Preferably, at least about 250 ml of the aqueous solution containing the composition of the present invention is added per liter of AMD water to be treated in order to achieve the desired treatment which is preventing further AMD and substantially removing at least one type of metal ion from the aqueous solution. More preferably, a 1:1 ratio of aqueous solution to AMD water is used. Depending on the compositions used, this value can significantly vary. Similar amounts can be employed in treating the source of AMD (e.g., mine waste rocks).

Preferably, the composition of the present invention also contains one or more silicates. The addition of silicates will facilitate the sequestering of the R-groups with the metal ions to form gel-like precipitates. The silicate compound can be a meta-silicate or an ortho-silicate. One preferred silicate is sodium meta-silicate. Preferably, from about 50 ppm to about 150 ppm of the silicate is present in the aqueous solution, more preferably from about 70 to about 110 ppm, most preferably about 75 ppm.

A preferred composition of the present invention has the following components with the following amounts based on the total amount of aqueous solution:

(a) a petroleum hydrocarbon—about 5 mg/l to about 80 mg/l, preferably about 19 mg/l;

(b) oil and/or grease—about 10 mg/l to about 700 mg/l, preferably about 200 mg/l;

(c) xylene—about 30 µg/l to about 700 µg/l, preferably about 120 µg/l;

(d) toluene—about 3 µg/l to about 70 µg/l preferably about 5 µg/l;

(e) ethyl benzene—about 5 µg/l to about 100 µg/l, preferably about 30 µg/l;

(f) benzene—trace amounts;

(g) cyanide—about 0.25 mg/l to about 10 mg/l, preferably about 0.5 mg/l; and (h) silicate—about 75 mg/l.

The petroleum hydrocarbon referenced above can be any petroleum hydrocarbon, such as diesel fuel, gasoline, and the like. The petroleum hydrocarbons tend to enhance micelles formation.

The oil present in the preferred composition can be oils composed largely of glycerides of fatty acids, chiefly oleic, palmitic, stearic, and linolenic. These oils are derived from animals, plants, seeds, or nuts. Petroleum and petroleum derived oils (e.g., aromatic, asphalt-base, aliphatic, wax-base, engine, machine mechanical oils and the like) can also be used.

The grease present in the preferred composition can be grease from inedible animal fat that is soft at ambient temperatures and is obtained from lard, tallow, bone, raw animal fat, and other waste products. Calcium and sodium based greases, greases containing glycerol and sorbitan, complex soap greases, lithium soap greases, extreme pressure greases usually containing some form of sulfur, phosphorous or an reactive agent, non-soap greases exemplified by organically modified clays, filler-type greases, and asphalt-base greases (blends of asphaltic materials with lubricating oils) are examples.

In lieu of xylene, toluene, ethyl benzene, and benzene in the preferred composition, other aromatic compounds can be used at similar amounts.

Besides the above ingredients in the preferred composition, it is preferred that the composition suspended, dissolved, and/or dispersed in an aqueous solution also have particulates suspended in the aqueous solution as well. Examples are dust, lint, and sand preferably having a mesh size—100 mesh. Preferably, about 15 mg/l to about 500 mg/l, more preferably about 100 mg/l, are present and uniformly distributed in the preferred composition.

A preferred source of the composition of the present invention is liquid commercial laundry waste (i.e., commercial laundry cleaning solvents or liquids that have been used in a cleaning cycle and contain lint, dirt and the like). More preferably, the liquid commercial laundry waste is a result of cleaning clothing and the like having petroleum-based stains.

One example of a liquid commercial laundry solution includes all of the following:

Resolve® which contains alkylphenolethoxylate and alphatic petroleum distillates;

Notice® which contains silicic acid disodium salt, alkylphenolethoxylate, and sodium hydroxide;

Choice DL® which contains alcohol ethoxylate and synthetic amorphous silicon dioxide hydrate; and Pinnacle® Liquid Fabric Softener which contains methyl bis(tallow amido ethyl)2-hydroxyethyl ammonium methyl sulfate ethoxylate and isopropanol.

This solution would also contain the soil, oils, grease and the like resulting from use in cleaning. Also, the solution may contain metal and non-metal ions such as Al, As, Cr, Cu, Fe, Si, and Zn. Any similar liquid commercial laundry waste having the ability to treat or prevent AMD or remove metal and/or non-metal ions from aqueous sources would also be acceptable. Further, the discussion concerning detergents in Van Nostrand Reinhold Encyclopedia of Chemistry, Fourth Ed. (1984), pp. 319–320 is incorporated herein by reference and can be used to assist in forming the composition of the present invention.

Since the composition of the present invention works best when the AMD waters or other aqueous solution has a pH greater than 7, enough of the aqueous solution containing the composition of the present invention should be added to the AMD waters or other aqueous source to achieve this desired pH. Alternatively, a base, such as NaOH, can additionally be added to raise the pH of the AMD waters or other aqueous source.

When the compositions of the present invention are added to AMD waters or to other aqueous sources, the metallic ions (e.g. iron, copper, zinc, arsenic, etc.) present in the waters are chelated with the Lewis base group present in the composition of the present invention, which causes the hydrophilicity of the composition to considerably change. Once the hydrophobicity overcomes the hydrophilicity of the composition, the complex is no longer water soluble and precipitates out of solution to form a gel-like material. This gel-like material tends to have negative surface charges and the potential of this charge is called the Zeta potential. The Zeta potential enhances precipitation of other metal ions in solution. Since the Zeta potential of the gel-like material is negative, cations will adsorb onto its surface.

The metals and non-metals that can be removed from the AMD waters or other aqueous sources include, but are not limited to, lead, aluminum, arsenic, manganese, selenium, silicon, nickel, zinc, iron, copper, and chromium. For instance, heavy metal ions can be removed and certain metal ions such as manganese can be substantially precipitated by the present invention's compositions at relatively low pHs. Hazardous ions such as selenium and arsenic can also be removed at low pHs. Also, the compounds of the present invention are highly effective ameliorants for mine waters when applied directly to mine waste rocks through precipitation reactions.

Accordingly, in preventing AMD from occurring or stopping any existing AMD, the compositions of the present invention, preferably in aqueous solution, are added to the AMD waters, as well as the source of the AMD, such as the mined waste rocks. This will effectively stop any further leaching of waters containing metal and/or non-metal ions as well as treat any existing AMD waters containing metal and/or non-metal ions. In treating the AMD waters, the metal and/or non-metal ions are removed from the waters in the form of a gel-like material which contains the metal and/or non-metal ions.

This process can also be used in waters other than AMD waters such as any aqueous source containing metal or non-metal ions in which their removal is desired.

For example, in waste water treatment or other industrial waters, it is desirable to remove metal ions. Again, just as in treating AMD waters, an effective amount of the composition of the present invention is added to the aqueous source to be treated in order to remove the metal ions present.

EXAMPLE

A composition was prepared by mixing the following ingredients in water to have the listed concentrations:

a mixture of oil and grease: 500 mg/l of aqueous soln.

toluene: 0.0075 mg/l of aqueous soln.

xylene: 0.06 mg/l of aqueous soln.

ethylbenzene: 0.065 mg/l of aqueous soln.

diesel fuel: 30 mg/l of aqueous soln.

gasoline: 30 mg/l of aqueous soln.

cyanide: 0.5 mg/l of aqueous soln.

silicate: 74.83 mg/l of aqueous soln.

An equal volume of this composition in solution (250 ml) was combined with AMD water (250 ml) obtained from a mine in West Virginia. The pH of the resulting solution was then lowered to 1.0 by the addition of concentrated sulfuric acid. The solution was then mixed for several minutes. The solution was then centrifuged to remove the resultant precipitate, and the supernatant was analyzed for chemical composition. The same procedure described above was carried out but without any pH adjustment so the pH of the resulting solution was 3.25. Then, the same procedure was carried out with the pH of the resulting solution raised to 7.2 by adding concentrated sodium hydroxide.

As reflected in Table 1, certain metal and non-metal ions were selectively removed based on the final pH of the solutions. The results also show a significant reduction in the content of soluble metal ions, especially at higher pHs. In this example, almost all the iron was removed at a pH of 3.25, while complete removal of all of the other listed metal and non-metal ions, except for Mn and Si, was accomplished at a pH of 7.2. The partial removal of manganese at low pHs was especially surprising since it's removal from AMD waters or other waste waters is extremely difficult.

TABLE 1

Precipitation as a Function of pH.

| | Chemical Composition (ppm) | | % Precipitated (ppm/ppm) | | |
|---|---|---|---|---|---|
| | AMD water | Solution | pH = 1.0 | pH = 3.25 | pH = 7.2 |
| Al | 549.6 | 12.39 | 16.82 | 9.253 | 99.65 |
| As | 4.039 | 0.602 | 17.75 | 44.98 | 100.0 |
| Cr | 0.775 | 0.885 | 100.0 | 100.0 | 100.0 |
| Cu | 1.059 | 0.626 | 1.009 | 14.30 | 100.0 |
| Fe | 582.0 | 11.62 | 1.819 | 94.98 | 100.0 |
| Pb | 1.312 | 0.000 | 100.0 | 100.0 | 100.0 |
| Mn | 9.764 | 0.000 | 15.90 | 7.435 | 65.30 |
| Ni | 1.210 | 0.000 | 100.0 | 100.0 | 100.0 |
| Se | 1.436 | 0.000 | 100.0 | 100.0 | 100.0 |
| Zn | 2.272 | 0.982 | 000.0 | 2.520 | 100.0 |
| Si | 28.34 | 74.83 | 32.75 | 9.683 | 86.51 |
| pH | 2.2 | 12.4 | | | |

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of removing an amount of at least one metal or non-metal ion from acid mine drainage waters comprising the steps of a) mixing or contacting acid mine drainage waters with an effective amount of an aqueous composition comprising a compound having a Lewis base group attached to a hydrophobic group, wherein said Lewis base group is capable of donating at least one lone pair of electrons to a metal and b) forming a gel material containing said amount of at least one metal or non-metal ion.

2. The method of claim 1, wherein said compound has the formula:

R—M wherein R is a hydrophobic organic group and M is a hydrophilic Lewis base group.

3. The method of claim 2, wherein R is an unsubstituted or substituted alkyl, ether, phenyl, phenoxy, carboxylic, amine, ester, or amide group.

4. The method of claim 2, wherein M is $PO_4^{3-}$, $CO_2^-$, $NH^{2-}$, $NH_2^-$, or $N^{3-}$.

5. The method of claim 1, wherein said compound is a water-soluble alkylated phosphate.

6. The method of claim 1, wherein the aqueous composition has a pH solution of at least greater than 7.

7. The method of claim 1, wherein said composition further comprises a silicate.

8. The method of claim 1, wherein said hydrophobic group is derived from a petroleum hydrocarbon.

9. The method of claim 1, wherein said hydrophobic group is derived from oil, grease, or a mixture thereof.

10. The method of claim 1, wherein said hydrophobic group is derived from xylene, toluene, ethyl benzene, benzene, or mixtures thereof.

11. The method of claim 1, wherein said Lewis base group is derived from cyanide.

12. The method of claim 1, wherein said composition further comprises suspended particulates.

13. The method of claim 1, wherein said composition is liquid commercial laundry waste.

14. A method of removing an amount of at least one metal or non-metal from acid mine drainage waters comprising the steps of a) mixing or contacting acid mine drainage waters with an effective amount of an aqueous composition having a Lewis base group capable of donating at least one pair of electrons to a metal attached to a hydrophobic group and comprising a cyanide, a silicate, a petroleum hydrocarbon, oil, grease, xylene, toluene, ethyl benzene, and benzene, and b) forming a gel material containing said amount of at least one metal or non-metal ion from said mine drainage waters.

15. The method of claim 14, wherein said silicate is sodium meta silicate.

16. The method of claim 14, wherein said silicate is a meta or ortho silicate.

17. The method of claim 14, wherein said composition further comprises suspended particulates.

18. The method of claim 14, wherein said composition is liquid commercial laundry waste.

19. A method to remove an amount of at least one metal or non-metal ion from an aqueous source comprising the step of mixing or contacting the aqueous source with an effective amount of an aqueous composition to remove said amount of at least one metal or non-metal ion present in said aqueous source by forming a gel material which contains said amount of at least one metal or non-metal ion, said composition comprising a compound having a Lewis base group attached to a hydrophobic group, wherein said Lewis base group is capable of donating at least one lone pair of electrons to a metal.

20. The method of claim 19, wherein said composition is liquid commercial laundry waste.

21. A method to selectively remove an amount of at least one metal or non-metal ion from an aqueous source comprising the steps of mixing or contacting the aqueous source with an effective amount of an aqueous composition comprising a compound having a Lewis base group attached to a hydrophobic group, wherein said Lewis base group is capable of donating at least one lone pair of electrons to a metal; and adjusting the pH of the aqueous source to selectively remove said amount of at least one metal or non-metal ion by forming a gel material which contains said amount of at least one metal or non-metal ion, wherein said at least one metal or non-metal ion is selected from the group consisting of Al, As, Cr, Cu, Fe, Pb, Mn, Ni, Se, Zn, and Si.

22. The method of claim 21, wherein said composition is liquid commercial laundry waste.

23. A method to treat acid mine drainage comprising the step of mixing or contacting acid mine drainage waters with an effective amount of a liquid commercial laundry waste to remove an amount of at least one metal or non-metal ion present in said acid mine drainage by forming a gel material containing said amount of at least one metal or non-metal ion, said laundry waste comprising a compound having a Lewis base group attached to a hydrophobic group, wherein said Lewis base group is capable of donating at least one lone pair of electrons to a metal.

24. A method to treat a material causing acid mine drainage comprising the step of contacting said material with an effective amount of an aqueous composition to stop or prevent leaching of waters containing at least one metal or non-metal ion, said composition comprising a compound having a Lewis base group attached to a hydrophobic group, wherein said Lewis base group is capable of donating at least one lone pair of electrons to a metal.

25. The method of claim 24, wherein said compound has the formula:

R—M wherein R is a hydrophobic organic group and M is a hydrophilic Lewis base group.

26. The method of claim 25, wherein R is an unsubstituted or substituted alkyl, ether, phenyl, phenoxy, carboxylic, amine, ester, or amide group.

27. The method of claim 25, wherein M is $PO_4^{3-}$, $CO_2^-$, $NH^{2-}$, $NH_2^-$, or $N^{3-}$.

28. The method of claim 24, wherein said compound is a water-soluble alkylated phosphate.

29. The method of claim 24, wherein the aqueous composition has a pH solution of at least greater than 7.

30. The method of claim 24, wherein said composition further comprises a silicate.

31. The method of claim 24, wherein said hydrophobic group is derived from a petroleum hydrocarbon.

32. The method of claim 24, wherein said hydrophobic group is derived from oil, grease, or a mixture thereof.

33. The method of claim 24, wherein said hydrophobic group is derived from xylene, toluene, ethyl benzene, benzene, or mixtures thereof.

34. The method of claim 24, wherein said Lewis base group is derived from cyanide.

35. The method of claim 24, wherein said composition further comprises suspended particulates.

36. The method of claim 24, wherein said composition is liquid commercial laundry waste.

37. A method to treat acid mine drainage comprising the steps of contacting a material causing said acid mine drainage with an effective amount of an aqueous composition to stop or prevent leaching of waters containing at least one metal or non-metal ion from said material, said composition comprising a cyanide, a silicate, a petroleum hydrocarbon, oil, grease, xylene, toluene, ethylbenzene, and benzene, said composition having a Lewis base group attached to a hydrophobic group, wherein said Lewis base group is capable of donating at least one lone pair of electrons to a metal.

38. The method of claim 37, wherein said silicate is sodium meta silicate.

39. The method of claim 37, wherein said silicate is a meta or ortho silicate.

40. The method of claim 37, wherein said composition further comprises suspended particulates.

41. The method of claim 37, wherein said composition is liquid commercial laundry waste.

42. A method to treat acid mine drainage comprising the step of contacting a material causing said acid mine drainage with an effective amount of a liquid commercial laundry waste to prevent or stop leaching of waters containing at least one metal or non-metal ion, said laundry waste comprising a compound having a Lewis base group attached to a hydrophobic group, wherein said Lewis base group is capable of donating at least one lone pair of electrons to a metal.

* * * * *